May 2, 1967

E. C. PETERSON 3,316,788

UP-AND-DOWN SHEAR

Filed Oct. 14, 1965

INVENTOR
Edward C. Peterson
BY
ATTORNEYS

May 2, 1967 E. C. PETERSON 3,316,788
UP-AND-DOWN SHEAR
Filed Oct. 14, 1965 2 Sheets-Sheet 2

INVENTOR
Edward C. Peterson
BY
ATTORNEYS

United States Patent Office 3,316,788
Patented May 2, 1967

3,316,788
UP-AND-DOWN SHEAR
Edward C. Peterson, Douglasville, Pa., assignor to Birdsboro Corporation, Birdsboro, Pa., a corporation of Pennsylvania
Filed Oct. 14, 1965, Ser. No. 495,878
4 Claims. (Cl. 83—375)

The present invention relates to up and down shears of the type which are used in rolling mills to cut stock such as bars, strip, sheet, plate, structural members, and the like, as they are progressed on rollers of a rolling mill table or the like.

A purpose of the invention is to simplify the mechanism for controlling the lift of the bottom knife in an up and down shear and particularly to avoid difficulties through maintenance.

A further purpose is to absorb the impact of clamping without requiring hydraulic mechanism.

A further purpose is to advance the clamp ahead of the upper shear blade in order to clamp the bar just prior to shearing.

A further purpose is to raise the lower knife slide independently of motion imparted by the crankshaft just prior to shearing to accomplish cutting above the roller table and reduce table maintenance.

A further purpose is to interpose a shock absorber between the clamp and the crankshaft.

Further purposes appear in the specification and in the claims.

In the drawings I have chosen to illustrate one only of the numerous embodiments in which the invention may appear, selecting the form shown from the standpoints of convenience in illustration, satisfactory operation and clear demonstration of the principles involved.

Figure 1:
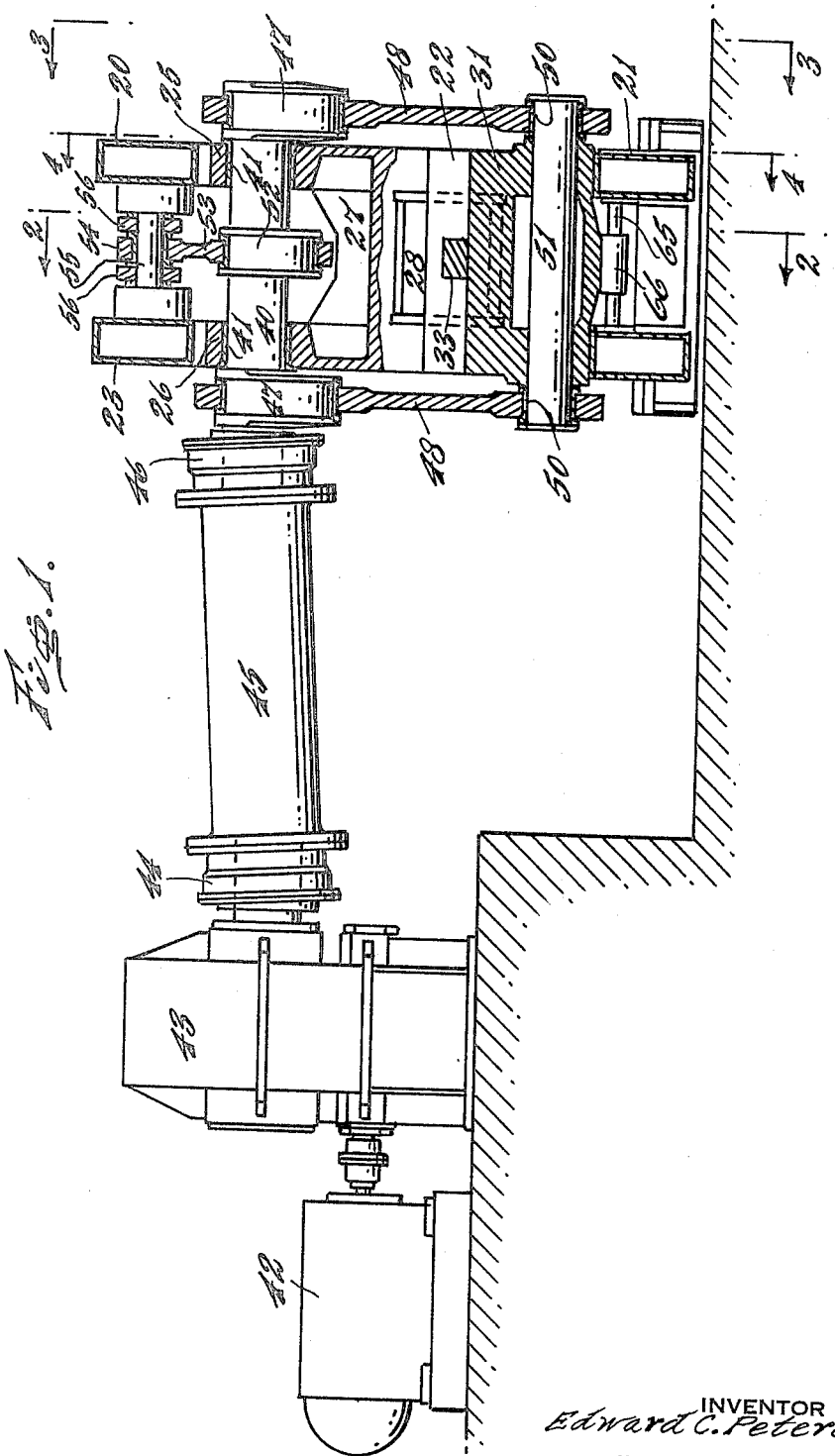
FIGURE 1 is a partially diagrammatic front elevation of the shear of the invention, partially in vertical section on the line 1—1 of FIGURE 2.

Describing in illustration but not in limitation and referring to the drawings:

Up and down cut shears are well known in the art. They have been subject to maintenance difficulties, largely because of the complex mechanism required for operation.

One type of prior art up-and-down shear employs a rocker driven from a crank by a connecting rod and manipulated by a combination of a lever and three links. There are numerous liners and pins employed which require heavy maintenance. The rocker is itself inaccessible and in the usual construction the parts are small enough so that it is difficult to make them strong enough.

In another prior art shear special hydraulic balancing is employed to avoid damage to the table and particularly to the table rolls or apron. It is usually necessary to employ a limit switch to stop the downcoming knife and this must be readjusted periodically. A separate hydraulic system is required for the clamping.

The present invention is concerned with a construction for an up-and-down shear which will be strong, reliable, free from requirement of maintenance and free from requirement for frequent adjustment.

In accordance with the invention, the clamp and the shear are mechanically driven and driven by the same mechanism. A crankshaft is mounted for bodily up-and-down motion on an upper knife slide, and it achieves its position vertically by its interrelation to a vertically movable lower knife slide. One eccentric on the crankshaft drives the shear and the other ecentric on the same crankshaft drives the clamp.

Accordingly, great simplicity is achieved in the mechanism.

Considering now the drawings in detail, a frame 20 has a base 21, uprights 22 at the opposite sides and a head 23. The uprights 22 provide ways 24 for vertically guiding an upper knife slide 25 comprising end pieces 26 and an interconecting web 27, and which supports at its lower end an upper knife 28.

In the lower part of the frame there are vertical ways 30 which guide a lower knife slide 31 which at its upper end supports a lower knife 32 which cooperates with the upper knife 28 to permit shearing when the knives move relatively toward one another.

Interposed between the knives in position to be sheared is a bar 33 which enters the shear in the direction of the arrow 34 on a rolling mill table 35 having a series of table rollers 36.

Small pieces of sheared bar leave through a chute 37 guided by a portion 38 on the lower knife slide.

Journalled concentrically on the upper knife slide 25 is a crankshaft 40 having concentric bearings 41 held by the upper knife slide and mounting the crankshaft in a generally horizontal position.

The crankshaft is driven notwithstanding its bodily change in position vertically by a prime mover 42 driving a gear reduction 43 which connects by a universal joint 44 with a tubular shaft 45 which in turn connects with another universal joint 46 with the crankshaft.

The crankshaft has at opposite ends first crank throws 47 which journal on ends of connecting rods 48 which at the opposite ends are journalled at 50 to a cross shaft 51 extending generally horizontal across the lower knife slide 31.

The first crank throws 47 thus control the relations between the shear knives as will be described. The crankshaft 40 also has a second crank throw 52, suitably near the middle, which journals one end of an eccentric strap 53, the other end of which journals at 54 in a pin 55 extending across at an intermediate point between levers 56. The levers 56 are fixedly pivoted at one end by pivot pin 57 mounted in the frame 20. At the other end the levers pivotally connect by pin 58 with a clevis 60 connected to a clamp 61, having a suitably tubular body 62 guided on the frame at 63 for vertical motion. Between the body 62 and the head 60 is interposed a shock absorber 64 of well known commercial type employing expanding ring compression springs to absorb shock taken by the clamp when it first engages the bar and prevent its transmission to the cam shaft. Beneath the lower knife slide is positioned, extending transverse to the direction of stock motion, a cam shaft 65 driven in any suitable manner (not shown) in synchronism with the main drive and carrying a cam 66 which is capable of raising the lower knife slide prior to cutting so as to raise the stock from the table rolls.

It is of importance in the design of the device to provide an interrelation between the throws of the cranks and the connections to the levers 56. In the preferred embodiment crank throws 47 are twice as great as crank throw 52 and the levers are connected to the eccentric strap 53 at the middle. Thus, when, as will be described, the crank throw 47 tends to permit the upper knife slide to move toward the lower knife slide at a particular rate, crank throw 52 provides downward movement at half that rate, but levers 56 multiply the rate of downward movement by 2, so that the clamp 61 moves down at the same rate as the upper knife. However, the position of the lower portion of clamp 61 is slightly below the upper knife 28 as the clamp approaches clamping position (the distance being so slight that it does not show on the drawings) so that the upper knife is slightly above the stock just before shearing, and the clamp achieves a position opposite the upper knife by compression of the shock absorber as shearing begins.

Figure 2:
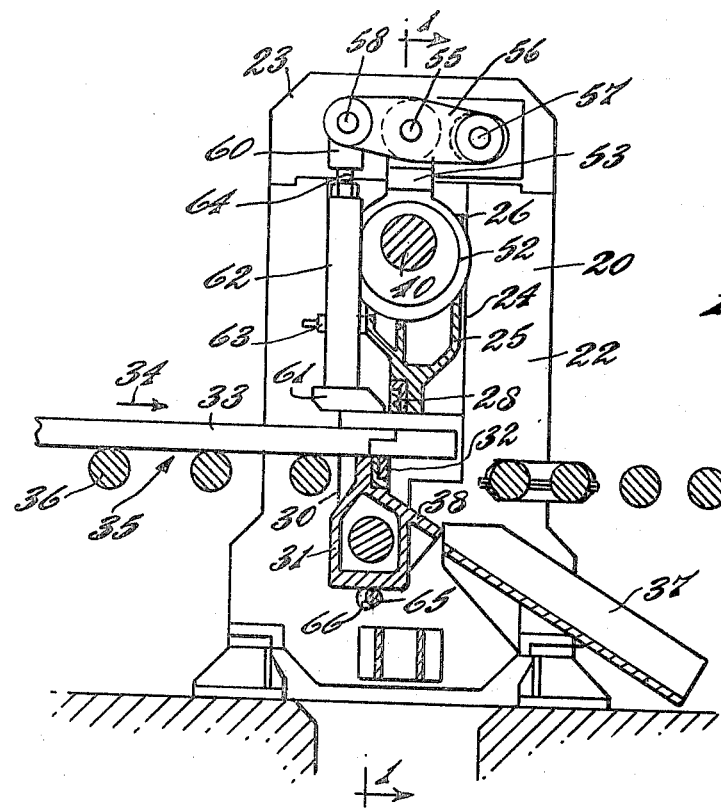
FIGURE 2 is a transverse section of FIGURE 1 on the line 2—2.
Figure 4:
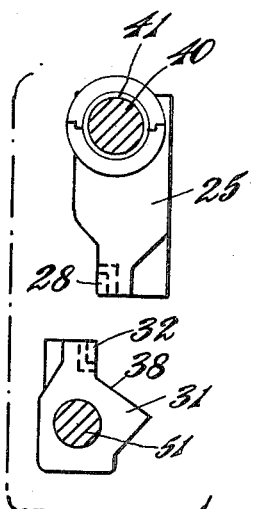
FIGURE 4 is a fragmentary section on the line 4—4 of FIGURE 1, illustrating the upper knife slide and the lower knife slide.
Figure 3:
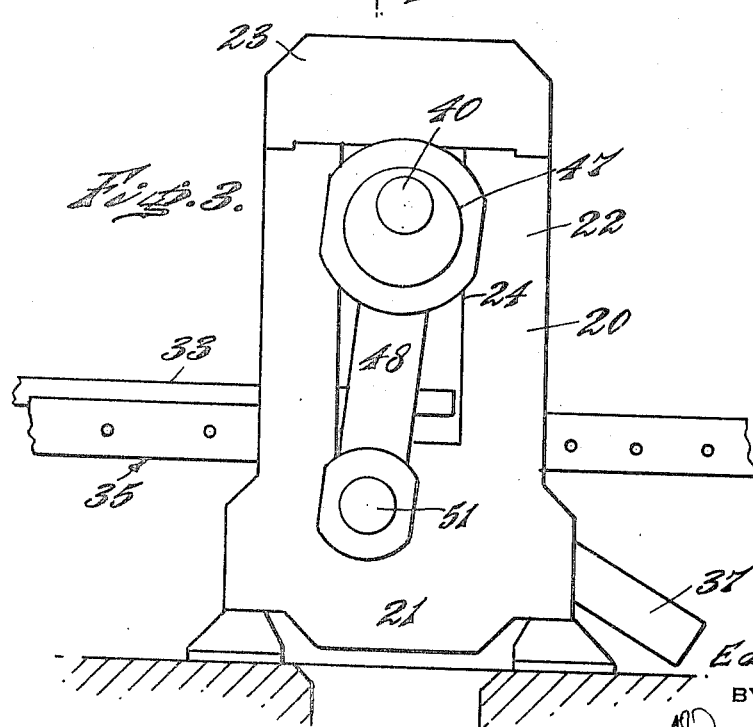
FIGURE 3 is a side elevation of FIGURE 1 at a position indicated by the line 3—3.

In operation, starting with the crankshaft retracted to raise the upper knife slide and the cam shaft retracted so as to lower the lower knife slide, at the beginning of the shear cycle the crankshaft begins turning, suitably in a clockwise direction in FIGURE 2. It turns about the axis of the first crank throws 47, and the journals 41 lower the upper knife slide while the crank throw 52 and levers 56 lower the clamp 61 concurrently with the lowering of the top knife slide.

As the same time that the crankshaft began its single revolution, the cam shaft began its single revolution clockwise in FIGURE 2, suitably operating under a separate prime mover. Both prime movers are of the type well known in the art which will produce a single rotation respectively of the crankshaft and the cam shaft 65. As the cam shaft turns it lifts the lower knife slide and with it lifts the work 33 above the table rollers.

When the clamp 61 contacts the top of the workpiece it is slightly ahead of the upper knife and compresses the shock absorber 64 so that the clamp is then flush with the upper knife. When the clamp firmly engages the workpiece 33, downward motion of the crankshaft by translation laterally ceases. Further rotation of the crankshaft then is about the axis of the journals 41 and the crank throws 47 act on the connecting rods 48 to lift the bottom knife slide to begin the operation of shearing.

As the crankshaft turns around the journals 41 as a fixed axis the crank throw 52 turns and lifts or retracts the clamp 61 an amount equivalent to the advance of the bottom slide.

At the 180° position, the bottom knife slide, connecting rods and related parts are loading the clamp.

With continued rotation of the cam shaft, the cam 66 lowers the bottom knife slide so that it seats in the housing and thenceforth the crank throws 47 act as fixed pivots during the remainder of the cycle. The journals 41 lift the upper knife slide back to its retracted position and the crank throw 52 lifts the clamp back to its retracted position.

Both prime movers then stop rotation at the completion of one rotation.

In view of my invention and disclosure, variations and modifications to meet individual whim or particular need will doubtless become evident to others skilled in the art to obtain all or part of the benefits of my invention without copying the structure shown, and I, therefore, claim all such insofar as they fall within the spirit and scope of my claims.

Having thus described my invention what I claim as new and desire to secure by Letters Patent is:

1. In an up-and-down shear, a frame, an upper knife slide vertically slidably mounted on the frame, an upper knife at the lower end of the upper knife slide, a crankshaft journalled in the upper knife slide and movable bodily up and down with the upper knife slide, a first crank throw on the crankshaft, a lower knife slide vertically slidably mounted on the frame, and having a lower position resting on the frame, a lower knife at the upper end of the lower knife slide cooperating in shearing position with the upper knife, means operatively connecting the lower knife with the first crank throw, vertically movable clamp means positioned adjacent the upper knife, a second crank throw on the crankshaft, and means operatively connecting the second crank throw with the clamp means.

2. A shear of claim 1, in combination with means for raising and then lowering the lower knife slide independently of motion imparted by the crankshaft, whereby starting a cycle with the lower knife slide resting on the frame and the upper knife slide and the clamp means raised, turning of the crankshaft about its first crank throw lowers the upper knife slide and concurrently lowers the clamp, turning of the means for raising the lower knife slide lifts the work, when the clamp means encounters the work and no further downward motion of the crankshaft is then possible the crankshaft turns about its journals as a fixed axis and by the first crank throw lifts the bottom knife slide through the means operatively connecting the lower knife slide with the first crank throw, and the second crank throw lifts the clamp means, with further turning of the means for raising and then lowering the lower knife slide, the lower knife slide is lowered to rest on the frame, and with further turning of the crankshaft about the first crank throw as an axis the upper knife slide is raised to retracted position and the second crank throw raises the clamp to retracted position.

3. A shear of claim 1, in which the means operatively connecting the second crank throw with the clamp means comprises a lever pivoted on the frame, an eccentric strap cooperating with the second crank throw and pivotally connected to the lever, and a pivotal connection from the lever to the clamp means.

4. A shear of claim 1, in which the means operatively connecting the second crank throw with the clamp means comprises a lever pivoted at one end on the frame, an eccentric strap engaging the second crank throw and pivotally connected to the lever at an intermediate point, and a pivot connection between the opposite end of the lever and the clamp means.

References Cited by the Examiner

UNITED STATES PATENTS

| | | | |
|---|---|---|---|
| 1,536,152 | 5/1925 | Schorn | 83—382 X |
| 2,043,398 | 6/1936 | Smitmans | 83—623 |
| 3,137,191 | 6/1964 | O'Brien | 83—623 X |

WILLIAM W. DYER, Jr., *Primary Examiner.*

J. M. MEISTER, *Assistant Examiner.*